Jan. 29, 1946.　　　B. G. HUNT　　　2,393,685
ELECTROLYTIC CELL
Filed Dec. 16, 1942　　　2 Sheets-Sheet 1

INVENTOR
Basil G. Hunt
BY
Pennie, Davis, Marvin & Edmonds
ATTORNEYS

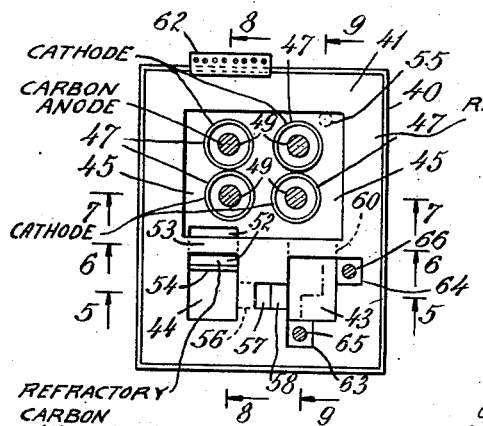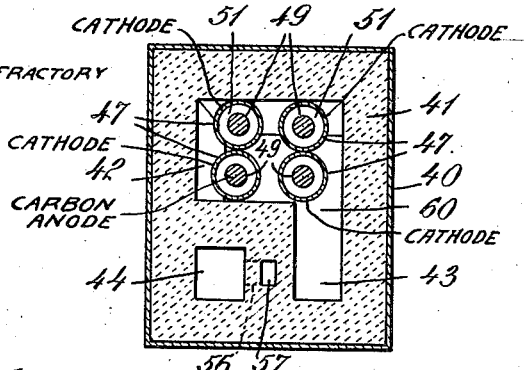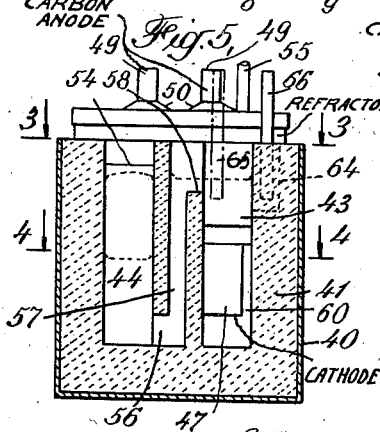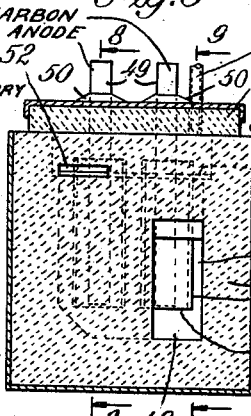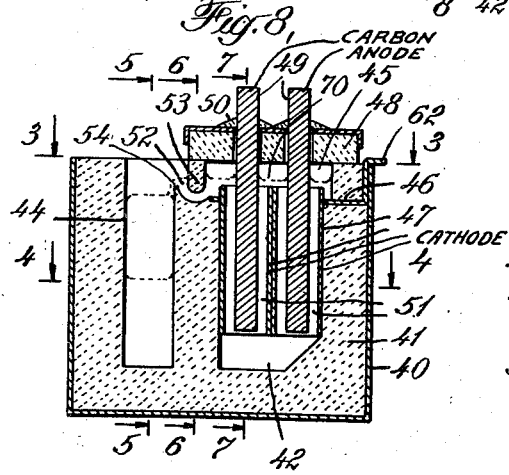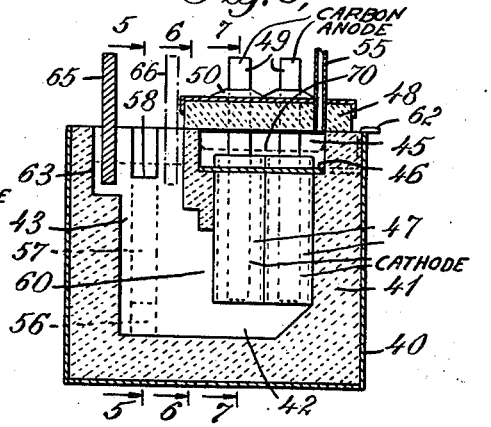

Patented Jan. 29, 1946

2,393,685

UNITED STATES PATENT OFFICE 2,393,685

ELECTROLYTIC CELL

Basil Graham Hunt, Trail, British Columbia, Canada, assignor, by mesne assignments, to The Mathieson Alkali Works (Inc.), a corporation of Virginia Application December 16, 1942, Serial No. 469,166
In Canada December 14, 1942

1 Claim. (Cl. 204—247)

This invention relates to improvements in electrolytic cells for the production of magnesium and chlorine from magnesium chloride fusions. This invention provides particularly certain variations and improvements in the invention described and claimed in application Serial No. 429,730, filed February 6, 1942, of which I am a joint inventor.

The electrolytic cell of this invention, in one embodiment, comprises an electrolysis chamber or channel defined by a vertical tubular cathode and a concentrically positioned anode, a superposed chlorine collection chamber, the electrolysis channel forming a passage or channel communicating at its upper end with the chlorine collection chamber only, said electrolysis channel being of substantially uniform horizontal cross section from end to end, means forming a laterally positioned metal collecting well, a passage connecting the lower part of the chlorine collection chamber with the metal collecting well trapped to prevent escape or contamination of chlorine separating in the chlorine collection chamber for rapidly flowing electrolyte and metal separating in the chlorine collection chamber to the metal collecting well, means forming a passage for returning electrolyte from the lower end of the metal collecting well to the lower end of the electrolysis channel and a connection for taking off chlorine from the chlorine collection chamber. One of the major advantages of this invention, and an important respect in which my present invention is distinguished from the broader joint invention of the piror application previously metioned, is the close spacing of anodes and cathodes it permits. Important power savings are thus accomplished. In operation, the mixture of electrolyte and chlorine and magnesium metal liberated by the electrolysis formed in the electrolysis channel flows rapidly upwardly through this chamber-passage into the chlorine collection chamber. This rapid circulation of the electrolyte is effected primarily by the gas lift action of chlorine liberated within the electrolysis chamber-passage. In the chorine collection chamber, the chlorine separates from the remaining mixture of electrolyte and magnesium metal which flows rapidly into the metal collecting well. In this well, where relative quiescene is provided, metal and electrolyte separate, the magnesium accumulating as a floating body, and the electrolyte is returned to the lower end of the electrolysis channel. A group of electrolysis channels thus defined may, with advantage, be combined in a unitary cell structure with a common chlorine collection chamber and a common metal collecting well.

Another feature of this invention, which is with advantage combined with the embodiment just described, is the provision of a conducting floor electrically connected to the cathode or cathodes for the chlorine collection chamber through which the electrolysis chamber-passage, or chamber-passages, opens and through which the tubular cathode or cathodes may extend for some distance. This arrangement affords several constructional advantages. Specifically, it provides a particularly advantageous arrangement for connecting the cathode or cathodes to the source of power for electrolysis eliminating lead-ins within the cell. The separating electrolyte mixture rapidly flowing over the floor of the chlorine collection chamber from the upper end of the electrolysis chamber-passage, or chamber passages, to the metal collecting well effectively protects this floor, even though constructed of exposed steel, without refractory cover, from attack by the hot chlorine separating in this chamber. This protection is enhanced by connection to the cathode or cathodes, rendering the floor cathodic.

Still another feature of this invention, which is with advantage combined with the embodiment previously described, is the arrangement of the metal collecting well so that the passage through which the mixture of electrolyte and metal enters discharges near the liquid level over a relatively deep body of metal and electrolyte. Two advantages are thus secured. A continuously replaced film of electrolyte is maintained over the floating body of metal accumulating in the well, thus protecting it from the atmosphere. This body of metal is also subjected to prolonged washing by the circulating electrolyte.

The two features of my invention just described are with advantage combined with the embodiment first described. They may, however, be used independently.

Magnesium chloride to replace that consumed by electrolysis may be supplied to the fusion in the cell in any convenient way. The cell of this invention is particularly adapted to the electrolysis of fusions to which makeup magnesium chloride is supplied as the anhydrous salt. In a cell comprising a plurality of electrolysis channels defined as previously described, the several electrolysis chanels may with advantage communicate at their lower ends with a common electrolyte chamber or receptacle to which electrolyte from the metal collecting well is returned.

In such a cell, the makeup salt is with advantage introduced into an auxiliary chamber connected to provide circulation between it and the electrolyte receptacle or connected so that electrolyte from the metal collecting well returns to the electrolyte receptacle through the auxiliary feed chamber.

Separate means for heating such an auxiliary feed chamber are with advantage provided, particularly if full advantage is to be taken of the cell's power efficiency with respect to the electrolysis. Auxiliary electrodes, serving to heat the fusion in the feed chamber by alternating current passing between these electrodes through the fusion as a resistor, are with advantage arranged in such auxiliary feed chambers. With this arrangement the direct current power required for electrolysis can be kept to the minimum regularly required for electrolysis without reference to the thermal requirements of the cell and the alternating current power supplied through such auxiliary electrodes can be independently regulated with reference to these thermal requirements.

The improved cell of this invention may be used with advantage for carrying out the method described and claimed in the application previously mentioned which, briefly, involves flowing a composite mixture of chlorine gas, magnesium metal and fused electrolyte upwardly through the electrolysis chamber to the chlorine collection chamber, the separation of the chlorine from the magnesium and electrolyte in the chlorine collection chamber and the recovery of this chlorine, the removal of a mixture of magnesium metal and electrolyte from the chlorine collection chamber, and the separation of magnesium from this mixture of metal and electrolyte in the metal collecting well.

The invention will be further described in connection with the accompanying drawings in which:

Fig. 3 is a plan view, partly in section, along the lines 3—3 of Figs. 5 and 8 of another form of electrolytic cell embodying the invention;

Fig. 4 is a sectional plan view along the lines 4—4 of Figs. 5 and 8;

Fig. 5 is a sectional side view along the lines 5—5 of Figs. 3, 8 and 9;

Fig. 6 is a sectional side view along the lines 6—6 of Figs. 3, 8 and 9;

Fig. 7 is a sectional side view along the lines 7—7 of Figs. 3, 8 and 9;

Fig. 8 is a sectional side view along the lines 8—8 of Figs. 3 and 6, and

Fig. 9 is a sectional side view along the lines 9—9 of Figs. 3 and 6.

Figure 1:
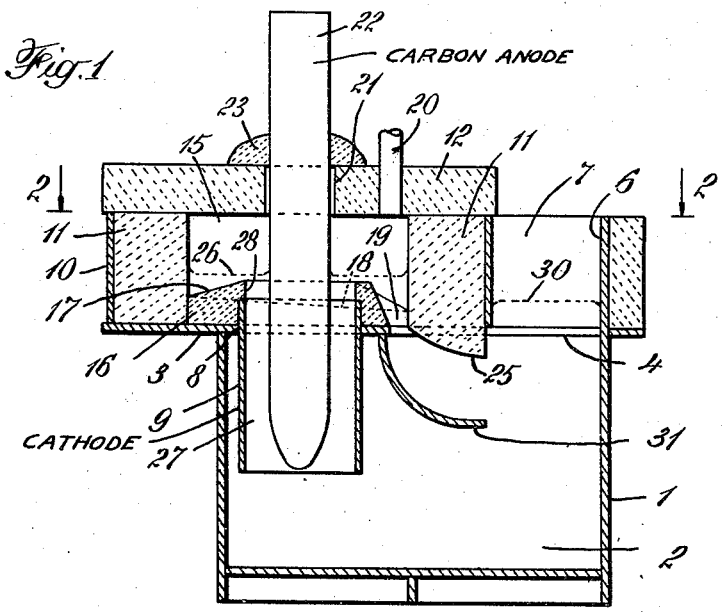
Fig. 1 is a sectional side view of an electrolytic cell embodying the invention.
Figure 2:
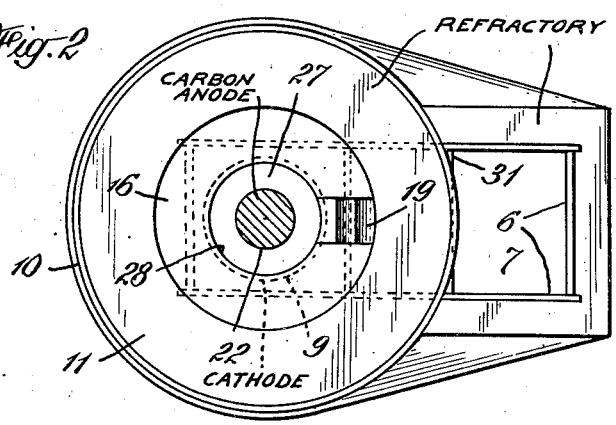
Fig. 2 is a plan view along the line 2—2 of Fig. 1.

The electrolytic cell illustrated in Figs. 1 and 2 comprises a steel vessel 1 forming a single electrolyte receptacle 2 for holding the main body of electrolyte, a steel plate 3 having an opening 4 with upward side extensions 6 forming a metal well and feed chamber 7. Another opening 8 is formed in the plate 3 for the insertion of a vertically arranged cylindrical or tubular cathode 9 welded to the plate. The vessel 1, plate 3, and cathode are electrically interconnected, by being in direct contact, and the power line to the cathode may be connected to this assembly at any suitable place. The upright steel sides 10 with their refractory linings 11 and top 12 enclose the chlorine chamber 15 above the plate 3 and the upper end of the cathode. The plate 3 serves as a support for the refractory floor 16 which surrounds the upper portion of the cathode. The refractory floor 16, as illustrated, extends above the inner surface of the cathode a short distance forming a cylindrical collar of the same internal diameter as the cathode and slops outwardly and downwardly therefrom, as indicated at 17, and also inclines, as shown by the broken line 18, towards the outlet port 19. The cover 12 is provided with a pipe 20 for taking off chlorine gas and an aperture 21 through which the cylindrical graphite anode 22 is suspended and maintained in a position concentric within the cathode 9. Any suitable refractory, such as fire-clay 23, is packed around the anode as a gas seal. The inner or active surface of the cathode 9 and the outer or active surface of the anode 22 are continuously vertical, the collar 28 being an extension of the active surface of the cathode. The electrolysis channel 27 within the vertical sides of the cathode 9 is of substantially uniform horizontal section throughout and with the collar above it forms a passage, opening into the chlorine collection chamber, of substantially uniform horizontal section from end to end. The refractory side wall 11 adjacent the port 19 has a lip 25 extending below the steel plate 3 to form a seal for the chlorine collection chamber 15.

It will be understood that the construction illustrated in Figs. 1 and 2 may be embodied in cells having any desired number of electrolysis channels, for example, in arrangements similar to those illustrated in Figs. 3 to 9.

In operation, the cell illustrated in Figs. 1 and 2 is charged with fused electrolyte to approximately the level 26 which is sufficient to submerge the floor 16 and the port 19. Anhydrous magnesium chloride is fed into the well 7 as required to maintain the desired electrolyte level. The direct current passed between the anode and the cathode forms an active electrolysis region in the annular electrolysis chamber 27. A pronounced, rapid circulation of electrolyte from the receptacle 2 is maintained. The electrolyte containing the liberated magnesium metal and chlorine as a composite mixture rises in the annular space between the cathode and the anode and flows into the chlorine collection chamber 15. The electrolyte, together with the chlorine and magnesium, which enters the chamber 15, spreads out radially from the upper end of the annular electrolysis chamber, flows over the floor 16 and the gaseous chlorine rapidly separates from the electrolyte, passing into the space above. Due to the gas lift action resulting from chlorine liberation within the electrolysis chamber-passage, the electrolyte mixture circulates rapidly, upwardly, through this chamber-passage and, due to this circulation and to the relative densities of the composite mixture and of the metal and electrolyte in the metal collecting well 7, the level 26 of electrolyte in the chlorine collection chamber is above the level of metal 30 in the well 7. The electrolyte, together with the metal it carries, which overflows from the electrolysis chamber into the chlorine collection chamber, flows through the port 19, under the lip 25 and into the well 7. The lip 25 and passage thereunder serve as a gas seal or trap preventing the flow of chlorine out of, or air into, the chlorine collection chamber 15. In order to aid in directing the mixture of magnesium and electrolyte in the direction of the well 7, I prefer to place a deflecting baffle 31 beneath the lip 25. Due to the relatively quiescent state of the electrolyte in and near the magnesium collecting well 7, and the buoyancy of the magnesium, the particles of magnesium in the electrolyte are separated out and accumulate forming a relatively deep body of metal in the upper part of the well. The separating electrolyte returns to the main body of electrolyte in the receptacle 2. The chlorine gas may be withdrawn from the cell, for example, by means of an exhauster to maintain the chlorine collection chamber under a pressure lower than the pressure of the atmosphere. In the simplified form of cell as illustrated in Figs. 1 and 2, the lower portions of the electrolyte receptacle 2 form a passageway extending between the lower end of the metal collecting well 7 and the lower end of the electrolysis channel through which the electrolyte returns from the lower end of the metal collecting well to the lower end of the electrolysis channel 27.

The electrolytic cell illustrated in Figs. 3 to 9 comprises a steel shell 40 lined with refractory material 41 within which is formed a receptacle 42 for containing the main body of molten electrolyte, a feed compartment 43 into which anhydrous magnesium chloride is introduced to replenish the chloride consumed in electrolysis, a metal collecting well 44, and a chlorine collection chamber 45. The steel plate 46 extends across a part of the cell closing the top of the receptacle 42 and forming a floor for the chlorine chamber 45. This steel floor may be covered with refractory material as in the cell of Figs. 1 and 2, but such protective covering is unnecessary in the cell of this invention. Four openings are formed in the floor through which are inserted, and welded to the floor, four steel cylindrical or tubular cathodes 47. These tubular cathodes 47, together with the anodes 49, form four annular electrolysis channels. The arrangement is such that each of the several electrolysis channels communicates at its upper end with the chlorine collection chamber only. The tops of the cathodes extend a short distance, for example, about three inches above the floor in a cell of the proportions illustrated, assuming an anode diameter of six inches. The chlorine collection chamber 45 is closed at the top with a refractory lined cover 48 having four apertures through which cylindrical anodes 49, preferably of graphite, are suspended, each being concentrically disposed in one of the cathodes. The spaces in the cover around the anodes are sealed with fire-clay 50 to prevent the escape of chlorine or the infiltration of air. The four sets of electrodes are nested within the receptacle 42 and terminate a short distance above the bottom of this receptacle to facilitate removal of cell mud and to provide free passage of electrolyte into the lower ends of the annular electrolysis channels 51 between the electrodes. The anodes may, however, rest upon the bottom of the receptacle if it is appropriately protected with insulating refractories. The active or inner surfaces of the cathodes and the active or outer surfaces of the anodes are continuously vertical and define continuously vertical electrolysis channels 51 which are of substantially uniform horizontal section and free of obstructions to the free flow of the mixture of electrolyte from end to end. A passageway 52 is formed in the refractory material constituting a wall of the chlorine collection chamber 45 to connect the chlorine collection chamber 45 with the metal collecting well 44.

This passageway is shaped so that its roof at one point extends downwardly as a depending tongue 53, the lower edge of which is positioned at a level below the normal electrolyte level at both sides of this point. The floor of this passageway adjacent the end thereof communicating with the metal collecting well 44 is shaped to provide an upwardly extending lip 54 constituting an overflow weir. As illustrated, this passageway is in the form of a U. A gas seal is provided by the tongue 53 projecting slightly below the level of the electrolyte in the passageway. The tongue 53 need project into the electrolyte only a short distance, about 1 inch for example, in a cell of the proportions illustrated, sufficient to prevent any leakage of air into the chlorine chamber, which is preferably maintained under slight vacuum by the removal of chlorine gas through pipe 55. If the tongue projects too deeply into the electrolyte in the passageway 52, the magnesium in the mixture flowing from the chlorine chamber 45 tends to become blocked by the tongue and does not readily pass on through the passageway into the metal well 44. The upwardly extending lip or overflow weir 54 serves to prevent a flow back into the chlorine chamber from the metal well. It also enables the mixture of electrolyte and molten magnesium flowing through the passageway 52 to be introduced into the metal collecting well 44 at a level near, preferably somewhat higher than the surface, that is the liquid level, of the contents of the well. The maximum height of the lip is determined by the level 70 of the electrolyte in the chlorine collection chamber when the cell is operating. The top of the lip or overflow weir 54 and the top of the cathodes 47, the upper end of the electrolysis channels, are with advantage positioned at substantially the same level, as illustrated. This arrangement facilitates the removal of electrolyte and metal through the passage 52 and promotes the washing of the metal collecting in the well 44, as compared to the situation which would prevail if the top of the cathodes was substantially higher, and prevents the emptying of passage 52 on any cessation of circulation and affords a maximum of effective electrolysis volume, in the electrolysis chamber-passages 51, as compared to the situation which would prevail if the top of the cathodes were substantially lower. The level of electrolyte in the chlorine collection chamber before the cell starts operating should be high enough just to cover the tops of the cathodes to prevent their corrosion by chlorine, and should, when the cell is operating, allow sufficient space at the top of the chlorine chamber for the collection and withdrawal of chlorine therefrom. The distance between the top of the cathodes and the roof of the chlorine collection chamber should be kept at a minimum to avoid unnecessary exposure of unsubmerged portions of the anodes.

The minimum-cross-sectional area of the U-shaped passageway will vary with the size of the cell. It has been found by experiment that satisfactory results are obtained when the area of the passageway corresponds approximately to 2½ square inches for each 1,000 amperes of cell capacity. While this value is not critical, the value cited gives a smooth and efficient operation. If the area is too small, the passageway will not allow sufficient flow of electrolyte to maintain circulation; the electrolyte level in the chlorine collection chamber will rise and magnesium will separate and float on the surface of the electrolyte and remain trapped in that chamber under conditions conducive to rechlorination of the metal. If the area is too great, the linear velocity of flow of the electrolyte across the floor 46 and through the passageway 52 may become too low to remove from the chlorine collection chamber magnesium which tends to stick to the floor. It should be noted here that the design of the passageway 52 is such that, should the circulation of the electrolyte, promoted by the gas lift action in the electrolysis chamber cease, as would happen for example if the electrolyte in the feed compartment were allowed to fall too low, the gas seal would remain effective, although the electrolyte in the passageway 52 would become stagnant. Thus the chlorine withdrawn from the cell would continue to be undiluted, while electrolysis was still proceeding, even though the electrolyte had stopped circulating.

The lateral passage 56 connects the metal collecting well 44 with the upright duct 57 which connects with the feed compartment near the top by means of the slot 58. The metal collecting well 44 is of sufficient depth and cross-sectional area to permit substantially complete separation of molten magnesium and electrolyte. The electrolyte, being heavier than the metal, sinks to the bottom of the well and flows through passage 56, duct 57, slot 58 to the feed compartment 43. The magnesium is allowed to accumulate in the metal well until there is sufficient to permit casting the metal directly from the cell. The metal well is large and the metal may be stored therein for considerable periods of time and removed at intervals convenient to operation as a result of the protection afforded by the continuously replaced film of electrolyte maintained over this metal as previously described.

The feed compartment 43 is open at the top and has a lateral extension feed inlet 60 at its lower end-portion connecting with the lower end-portion of the receptacle 42. Suitable mechanism may be provided to feed magnesium chloride, either molten or solid, to the feed compartment, continuously or intermittently. The electrolyte from the well 44 flowing through the slot 58 enters the upper part of the feed compartment 43. The electrolyte is led into the upper part of the feed compartment rather than into the lower part, to prevent overheating of the electrolyte in the upper part of the feed compartment due to the supplementary heating hereinafter described. This method of returning the electrolyte also facilitates thorough mixing of the electrolyte as well as maintenance of uniform temperatures throughout the cell. The feed compartment 43 is preferably so shaped and so positioned in the cell that the bottom of the feed compartment and the electrolyte receptacle may be cleaned through the opening at the top of the feed compartment while the cell is operating. The lower part of the sides of the receptacle 42 farthest from the electrolyte feed inlet 60 may be made to slope inwardly, thereby causing the cell mud to collect near the electrolyte feed inlet from where it can easily be removed by dredging through the top of the feed compartmnt.

The shell 40, floor 46 and cathodes 47 are electrically interconnected and the plate 62 on the shell serves as an electrical terminal for the cathode power line.

In order to aid in fusing or in maintaining in a fused condition the freshly added make-up salt, lateral extensions 63 and 64 are formed in the feed well and are provided with auxiliary electrodes 65 and 66 for supplemental electrical heating. These electrodes are supplied with power as alternating current. This arrangement serves to heat added make-up salt to the desired temperature, and permits simplified control of the temperature of the electrolyte through a wide range independently of control of the direct current power supplied to the cell for electrolysis. Without this supplementary heating, the operating temperature of the cell can be controlled by varying the depth of submergence of the anodes or by varying the current for electrolysis, but with much less advantage. A single such electrode may be provided in the feed well, instead of a pair, and the alternating current power then connected across this electrode and either the cathodic surfaces or the anodes of the cell.

In operating the cell illustrated in Figs. 3 to 9, the fused electrolyte with which the cell is charged flows upwardly from the lower portion of the receptacle 42 into and through the annular electrolysis chambers 51. As a result of the electrolysis, the magnesium chloride component of the electrolyte is decomposed into magnesium metal and chlorine and there is formed a composite mixture comprising chlorine gas, magnesium and electrolyte. As a result of the decrease in density due to the increase in temperature and the liberation of chlorine gas, the composite mixture flows rapidly up into the chlorine collection chamber 45. The upward flow is primarily due to the gas lift action of the liberated chlorine. The mixture of electrolyte and magnesium which spreads over the floor 46 flows rapidly through the passageway 52 from which it drops into the contents of the metal collecting well 44 where the electrolyte component of the mixture washes the accumulating lighter metal as it separates as a floating body due to the relative quiescence in this well. The electrolyte also tends to maintain a protective film over the surface of this separating and accumulating metal. The electrolyte separating from the metal passes into the bottom of the well and then flows laterally through the passage 56, upwardly through the duct 57, laterally through the slot 58 and into the upper part of the feed compartment 43. Anhydrous magnesium chloride is introduced continuously, or in batches, as desired, into the electrolyte in the feed compartment 43. In order to effect a more rapid melting of magnesium chloride supplied as a solid and also to provide more effective intermixing of the fused electrolyte with the added magnesium chloride, the supplemental heating provided by the electrodes 65 and 66 located in lateral extensions of the feed well is utilized. Magnesium chloride may also be introduced into the electrolyte in the feed compartment 43* as the molten salt.

*Example*

A cell consisting of a brick-lined steel shell was constructed substantially as shown in Figs. 3 to 9 with the following dimensions:

Outside steel shell: 7'0" x 5'3½" x 5'5"
Feed well: 20½" x 10½" x 4'3"
Electrolyte receptacle: 22½" x 2'3" x 3'6"
Chlorine collection chamber: 2'4¾" x 3'0" x 9"
Metal collecting well: 14¾ x 13½" x 4'3"
Anodes: 6" diam. x 5'
Cathodes: 9¾" I. D. x 36"
U-shaped passageway (cross section under tongue): 9" x 3"

About 2500 pounds of molten, anhydrous magnesium chloride electrolyte was added to the cell, sufficient to fill the cell to a depth of about 45 inches. A current of 10,000 amperes, distributed equally among each pair of electrodes, provided a cathodic current density of 2.27 amperes per square inch. A voltage of 5.2 volts was required during electrolysis. Magnesium metal was produced at a rate of 170 pounds per 24 hours; the gas evolved from the cell averaged about 94% chlorine. Direct current power requirements were 7.5 k. w. h. per pound of magnesium produced. An average of 1.0 k. w. h. of alternating current power per pound of magnesium was required for supplementary heating to maintain the operating temperature of the electrolyte at 730° C. Total power requirements, therefore, were about 8.5 k. w. h. per pound of magnesium produced. The current efficiency over a representative period averaged about 72%. The metal was removed from the metal collecting well once every 12 hours and cast directly into ingots. Makeup salt was added from time to time to maintain the level of the electrolyte, which, during operation, was about three inches higher in the chlorine collection chamber than in the metal collecting well and feed compartment.

In cells embodying the present invention, there is at any one time but a very small amount of magnesium metal in the chlorine collection chamber. This quantity, the momentary concentration of magesium in the chlorine collection chamber, is a function both of the rate of liberation of magnesium and the rate of circulation of the electrolyte. The rate of liberation of magnesium may approximate, for example, 200 pounds per 24 hours from 2500 pounds of electrolyte. As will be apparent, with any given rate of liberation, the momentary concentration of magnesium in the chlorine collection chamber decreases as the rate of electrolyte circulation increases.

In cells embodying the present invention, the magnesium liberated at the cathode may assume one of at least two forms depending upon the conditions of electrolysis. It may take the form of small prills which, like the chlorine, become intimately mixed with the electrolyte. If this occurs, the magnesium metal, passing upwardly through the region of electrolysis with the electrolyte and chlorine, may recombine to some extent with the chlorine unless the cathodes are relatively short, in which case there is less opportunity for recombination. Short cathodes may, however, be disadvantageous because the gas lift effect is less and also because the total possible production of magnesium is less than with longer cathodes of the same internal diameter. The second form in which magnesium may be liberated is as globules clinging to the cathodes. When the magnesium is liberated as globules, which cling to the cathode as they rise into the chlorine chamber, the magnesium is cathodically protected from recombination with chlorine during its passage through the electrolysis chamber. While the recovery of magnesium is effected more efficiently as a result of the suppression of rechlorination of the metal under these circumstances, the magnesium is not so readily removed from the electrolysis chamber when the metal is in the form of globules as it is when the metal is in the form of fine prills. The globules tend to hang back on the cathode, increasing the resistance to the upward flow through the region of electrolysis. In extreme cases, separate globules may build up to a size that will cause short circuiting between the anode and cathode. The cell of this invention, in a preferred method of operation, overcomes this difficulty. I have found that the metal in the form of globules may be easily withdrawn from the region of electrolysis by maintaining the electrolyte in the chlorine chamber at a level such that, when the cell is ready to operate, the surface of the electrolyte is just above the top of the cathodes. This permits the gas lift action to be exerted in an upward direction beyond the top of the cathodes and also supplies a medium above the cathodes which, because it is denser than the light, frothy mixture of chlorine gas and electrolyte which would be the medium if the electrolyte level were below the tops of the cathodes, increases the buoyancy of the magnesium globules and facilitates their removal from the region of electrolysis. In a particularly advantageous form, therefore, the top of the cathodes is positioned just below the static electrolyte level in the cell.

The operation of the cell depends primarily upon the gas lift action in the region of electrolysis. The chlorine liberated at the anode becomes intimately dispersed in the electrolyte and, due to the decreased density of the mixture of chlorine gas and electrolyte as compared with the density of the electrolyte in other parts of the cell, the electrolyte mixture is caused to flow upwardly through the region of electrolysis, carrying with it the liberated magnesium, and to circulate throughout the cell as previously described. The density of the mixture between the cathodes and their respective anodes will vary from a maximum at the bottom of the anode, where only a small amount of chlorine will be liberated and become dispersed in the electrolyte, to a minimum at the top of the cathode in the chlorine chamber. The gas lift effect will, accordingly, increase with increased submergence of the electrodes due to the greater amount of chlorine liberated at a greater depth.

Advantages of the cell of the prior application previously mentioned which are retained in the present cell include avoidance or amelioration of problems with respect to refractories, uniform temperatures throughout the cell, recovery of chlorine in high concentration and the small size of the cell which reduces construction costs, space requirements, wiring requirements, heat losses and attendant power consumption.

The separate metal collecting well permits the accumulation of a large quantity of magnesium metal which may be removed at intervals convenient to the operation. The constantly renewing film of electrolyte over the surface of the magnesium in the well protects the metal from oxidation and it may be stored in the well for long periods of time. Because the metal may be cast in marketable form directly from the cell there is an appreciable saving in time, equipment and fuel which would otherwise be required in refining the metal. The separation of metal collecting well and feed chamber affords segregation of metal and feed, thereby avoiding the occurrence of any undesirable reactions between metal and feed which might decrease the available magnesium production.

Another feature of the invention is the continuous production of chlorine gas of consistent and high concentration (over 90%). The gas requires little or no further processing for its use elsewhere.

The design of the cell is such that it can be used with many devices by which the gas lift effect may be obtained, either electrolytically as described, or by mechanical means, such as injecting chlorine gas into the electrolysis chamber just below the electrodes. The cathodes may be cylindrical and vertical, as in the preferred cells herein described but inclination away from the vertical insufficient to impede the rapid circulation characteristics of the cell of my invention in operation is comprehended by my use of the term "vertical." Likewise cathodes of rectangular horizontal section can be used. Such cathodes may be formed of steel tubes of rectangular section or of rectangular plates joined at opposite vertical edges, for example, by refractory elements to form a rectangular tube constituting the electrolysis channel. Plate, rather than cylindrical, anodes can be used with such cathodes of rectangular horizontal section. The anodes are, in any case, concentrically and symmetrically positioned in the cathodes.

The cell, unlike most conventional cells, has no exposed cathode lead-ins and therefore corrosion of such parts is eliminated.

In referring to chloride fusions, I intend to include generally salt fusions, comprising magnesium chloride, heavier than magnesium and liberating magnesium and chlorine when subjected to electrolysis. Such fusions may contain chlorides other than magnesium and may contain salts other than chlorides. The various additions made to control properties of the fusion such as density, viscosity and melting point are generally useful in the cell of my invention as in conventional practice.

I claim:

In a diaphragmless cell for the electrolysis of chloride fusions heavier than magnesium to produce magnesium and chlorine, the combination comprising a generally vertical electrolysis channel defined by generally vertical walls comprising separated anode and cathode members closely spaced and substantially parallel with respect to each other at all points, said electrolysis channel forming a passage of substantially uniform horizontal section from end to end, means forming a superposed chlorine collection chamber, said electrolysis channel communicating at its upper end with said chlorine collection chamber only, whereby all electrolyte, magnesium and chlorine discharged from the upper end of said electrolysis channel will be required to enter said chlorine collection chamber, means forming a metal collecting well laterally disposed with respect to said electrolysis channel and to said chlorine collection chamber, a wall of the chlorine collection chamber being shaped to provide a passageway extending between the lower portion of the chlorine collection chamber and the metal collecting well with the roof of said passage at one point in its length positioned at a level below the normal electrolyte level in this passage and with the floor of said passageway adjacent the end thereof communicating with the metal collecting well in the form of an overflow weir, the upper end of said overflow weir and the top of said electrolysis channel being positioned at substantially the same level, whereby said passageway is adapted to direct into the metal collecting well all of the electrolyte and metal flowing rapidly from the electrolysis channel through the chlorine collection chamber but is trapped to prevent the flow of gas therethrough, means forming a passageway extending between the lower end of the metal collecting well and the lower end of the electrolysis channel adapted for returning electrolyte from the lower end of the metal collecting well to the lower end of the electrolysis channel, and a connection for taking off chlorine from the chlorine collection chamber.

BASIL GRAHAM HUNT.